US008402111B2

(12) United States Patent
Raleigh

(10) Patent No.: US 8,402,111 B2
(45) Date of Patent: Mar. 19, 2013

(54) DEVICE ASSISTED SERVICES INSTALL

(75) Inventor: Gregory G. Raleigh, Woodside, CA (US)

(73) Assignee: Headwater Partners I, LLC, Redwood Shores, CA (US)

( * ) Notice: Subject to any disclaimer, the term of this patent is extended or adjusted under 35 U.S.C. 154(b) by 92 days.

(21) Appl. No.: 12/694,455

(22) Filed: Jan. 27, 2010

(65) Prior Publication Data

US 2010/0198939 A1 Aug. 5, 2010

Related U.S. Application Data

(63) Continuation-in-part of application No. 12/380,780, filed on Mar. 2, 2009.

(60) Provisional application No. 61/206,354, filed on Jan. 28, 2009, provisional application No. 61/206,944, (Continued)

(51) Int. Cl.
*G06F 15/173* (2006.01)

(52) U.S. Cl. ............... 709/217; 709/224; 455/414.1; 235/383

(58) Field of Classification Search ............ 705/28, 705/30, 34, 26.1; 709/203, 217, 223, 224; 455/461, 414.1, 434, 456.3, 466; 379/201.01; 370/252, 352; 235/376, 383

See application file for complete search history.

(56) References Cited

U.S. PATENT DOCUMENTS

| 5,283,904 A | 2/1994 | Carson et al. |
| 5,577,100 A | 11/1996 | McGregor et al. |
| 5,594,777 A | 1/1997 | Makkonen et al. |
| 5,794,142 A | 8/1998 | Vanttila et al. |
| 5,892,900 A | 4/1999 | Ginter et al. |
| 5,903,845 A | 5/1999 | Buhrmann et al. |

(Continued)

FOREIGN PATENT DOCUMENTS

| EP | 1463238 | 9/2004 |
| EP | 1739518 | 6/2005 |

(Continued)

OTHER PUBLICATIONS

Author Unknown, "Data Roaming Tariffs—Transparency Measures." EUROPA—Europe's Information Society Thematic Portal website, date unknown.

(Continued)

*Primary Examiner* — Andrew Joseph Rudy
(74) *Attorney, Agent, or Firm* — Krista S. Jacobsen

(57) ABSTRACT

Device assisted services (DAS) install techniques are provided in accordance with some embodiments. In some embodiments, DAS install techniques for providing service processors for mobile devices are provided. In some embodiments, DAS install techniques for downloading/installing new and/or updated service processors for mobile devices are provided. In some embodiments, DAS install techniques for providing verified service processors for mobile devices are provided. In some embodiments, DAS install techniques for providing secured service processors for mobile devices are provided. In some embodiments, DAS install techniques include determining if a communications device in communication with a wireless network includes a service processor for assisting control of the communications device use of a service on the wireless network, in which the service processor includes a service profile that includes a plurality of service policy settings, and in which the service profile is associated with a service plan that provides for access to the service; and verifying the service processor. In some embodiments, DAS install techniques include providing a generic first version service processor for downloading and installing a second version service processor.

30 Claims, 5 Drawing Sheets

Related U.S. Application Data filed on Feb. 4, 2009, provisional application No. 61/207,393, filed on Feb. 10, 2009, provisional application No. 61/207,739, filed on Feb. 13, 2009, provisional application No. 61/264,120, filed on Nov. 24, 2009.

(56) References Cited

U.S. PATENT DOCUMENTS

| | | |
|---|---|---|
| 5,933,778 A | 8/1999 | Buhrmann et al. |
| 5,940,472 A | 8/1999 | Newman et al. |
| 6,038,452 A | 3/2000 | Strawczynski et al. |
| 6,047,268 A | 4/2000 | Bartoli et al. |
| 6,078,953 A | 6/2000 | Vaid et al. |
| 6,098,878 A | 8/2000 | Dent et al. |
| 6,141,686 A | 10/2000 | Jackowski et al. |
| 6,148,336 A | 11/2000 | Thomas et al. |
| 6,198,915 B1 | 3/2001 | McGregor et al. |
| 6,226,277 B1 | 5/2001 | Chuah |
| 6,263,055 B1 | 7/2001 | Garland et al. |
| 6,317,584 B1 | 11/2001 | Abu-Amara et al. |
| 6,418,147 B1 | 7/2002 | Wiedeman |
| 6,449,479 B1 | 9/2002 | Sanchez |
| 6,477,670 B1 | 11/2002 | Ahmadvand |
| 6,502,131 B1 | 12/2002 | Vaid et al. |
| 6,505,114 B2 | 1/2003 | Luciani |
| 6,532,235 B1 | 3/2003 | Benson et al. |
| 6,532,579 B2 | 3/2003 | Sato et al. |
| 6,539,082 B1 | 3/2003 | Lowe et al. |
| 6,563,806 B1 | 5/2003 | Yano et al. |
| 6,574,321 B1 | 6/2003 | Cox et al. |
| 6,574,465 B2 | 6/2003 | Marsh et al. |
| 6,581,092 B1 | 6/2003 | Motoyama et al. |
| 6,603,969 B1 | 8/2003 | Vuoristo et al. |
| 6,606,744 B1 | 8/2003 | Mikurak |
| 6,631,122 B1 | 10/2003 | Arunachalam et al. |
| 6,639,975 B1 | 10/2003 | O'Neal et al. |
| 6,650,887 B2 | 11/2003 | McGregor et al. |
| 6,651,101 B1 | 11/2003 | Gai et al. |
| 6,658,254 B1 | 12/2003 | Purdy et al. |
| 6,678,516 B2 * | 1/2004 | Nordman et al. .......... 455/414.1 |
| 6,683,853 B1 | 1/2004 | Carlsson et al. |
| 6,684,244 B1 | 1/2004 | Goldman et al. |
| 6,725,031 B2 | 4/2004 | Watler et al. |
| 6,763,000 B1 | 7/2004 | Walsh |
| 6,765,864 B1 | 7/2004 | Natarajan et al. |
| 6,785,889 B1 | 8/2004 | Williams |
| 6,829,596 B1 | 12/2004 | Frazee |
| 6,829,696 B1 | 12/2004 | Balmer et al. |
| 6,839,340 B1 | 1/2005 | Voit et al. |
| 6,876,653 B2 | 4/2005 | Ambe et al. |
| 6,920,455 B1 | 7/2005 | Weschler |
| 6,922,562 B2 | 7/2005 | Ward et al. |
| 6,947,723 B1 | 9/2005 | Gurnani et al. |
| 6,952,428 B1 | 10/2005 | Necka et al. |
| 6,965,667 B2 | 11/2005 | Trabandt et al. |
| 6,967,958 B2 | 11/2005 | Ono et al. |
| 6,996,076 B1 | 2/2006 | Forbes et al. |
| 6,998,985 B2 | 2/2006 | Reisman et al. |
| 7,002,920 B1 | 2/2006 | Ayyagari et al. |
| 7,024,200 B2 | 4/2006 | McKenna et al. |
| 7,027,408 B2 | 4/2006 | Nabkel et al. |
| 7,039,403 B2 | 5/2006 | Wong |
| 7,042,988 B2 | 5/2006 | Juitt et al. |
| 7,058,968 B2 | 6/2006 | Rowland et al. |
| 7,068,600 B2 | 6/2006 | Cain |
| 7,069,248 B2 | 6/2006 | Huber |
| 7,092,696 B1 | 8/2006 | Hosain et al. |
| 7,113,997 B2 | 9/2006 | Jayapalan et al. |
| 7,142,876 B2 | 11/2006 | Trossen et al. |
| 7,158,792 B1 | 1/2007 | Cook et al. |
| 7,167,078 B2 | 1/2007 | Pourchot |
| 7,174,174 B2 * | 2/2007 | Boris et al. ................... 455/461 |
| 7,180,855 B1 | 2/2007 | Lin |
| 7,197,321 B2 | 3/2007 | Erskine et al. |
| 7,212,491 B2 | 5/2007 | Koga |
| 7,228,354 B2 | 6/2007 | Chambliss et al. |
| 7,236,780 B2 | 6/2007 | Benco et al. |
| 7,242,920 B2 | 7/2007 | Morris |
| 7,245,901 B2 | 7/2007 | McGregor et al. |
| 7,251,218 B2 | 7/2007 | Jorgensen |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,289,489 B1 | 10/2007 | Kung et al. |
| 7,290,283 B2 | 10/2007 | Copeland, III |
| 7,317,699 B2 | 1/2008 | Godfrey et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,346,410 B2 | 3/2008 | Uchiyama |
| 7,349,695 B2 | 3/2008 | Oommen et al. |
| 7,353,533 B2 | 4/2008 | Wright et al. |
| 7,356,337 B2 | 4/2008 | Florence |
| 7,366,497 B2 | 4/2008 | Nagata |
| 7,373,136 B2 | 5/2008 | Watler et al. |
| 7,373,179 B2 | 5/2008 | Stine et al. |
| 7,388,950 B2 | 6/2008 | Elsey et al. |
| 7,401,338 B1 | 7/2008 | Bowen et al. |
| 7,403,763 B2 | 7/2008 | Maes |
| 7,418,253 B2 | 8/2008 | Kavanagh |
| 7,418,257 B2 | 8/2008 | Kim |
| 7,421,004 B2 | 9/2008 | Feher |
| 7,450,591 B2 | 11/2008 | Korling et al. |
| 7,450,927 B1 | 11/2008 | Creswell et al. |
| 7,486,185 B2 | 2/2009 | Culpepper et al. |
| 7,499,537 B2 | 3/2009 | Elsey et al. |
| 7,515,608 B2 | 4/2009 | Yuan et al. |
| 7,516,219 B2 | 4/2009 | Moghaddam et al. |
| 7,546,629 B2 | 6/2009 | Albert et al. |
| 7,565,141 B2 | 7/2009 | Macaluso |
| 7,574,731 B2 | 8/2009 | Fascenda |
| 7,580,857 B2 | 8/2009 | VanFleet et al. |
| 7,583,964 B2 | 9/2009 | Wong |
| 7,599,288 B2 | 10/2009 | Cole et al. |
| 7,609,650 B2 | 10/2009 | Roskowski et al. |
| 7,609,700 B1 | 10/2009 | Ying et al. |
| 7,610,328 B2 | 10/2009 | Haase et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,627,314 B2 | 12/2009 | Carlson et al. |
| 7,636,574 B2 * | 12/2009 | Poosala ...................... 455/456.3 |
| 7,644,151 B2 | 1/2010 | Jerrim et al. |
| 7,644,267 B2 | 1/2010 | Ylikoski et al. |
| 7,647,047 B2 | 1/2010 | Moghaddam et al. |
| 7,650,137 B2 | 1/2010 | Jobs et al. |
| 7,668,176 B2 | 2/2010 | Chuah |
| 7,668,903 B2 | 2/2010 | Edwards et al. |
| 7,685,131 B2 | 3/2010 | Batra et al. |
| 7,693,720 B2 | 4/2010 | Kennewick et al. |
| 7,710,932 B2 | 5/2010 | Muthuswamy et al. |
| 7,720,505 B2 | 5/2010 | Gopi et al. |
| 7,734,784 B1 | 6/2010 | Araujo et al. |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,756,534 B2 * | 7/2010 | Anupam et al. .............. 455/466 |
| 7,778,643 B2 | 8/2010 | Laroia et al. |
| 7,792,538 B2 | 9/2010 | Kozisek |
| 7,792,708 B2 | 9/2010 | Alva |
| 7,797,204 B2 * | 9/2010 | Balent ............................ 705/28 |
| 7,797,401 B2 | 9/2010 | Stewart et al. |
| 7,801,523 B1 | 9/2010 | Kenderov |
| 7,822,837 B1 | 10/2010 | Urban et al. |
| 7,844,728 B2 | 11/2010 | Anderson et al. |
| 7,848,768 B2 | 12/2010 | Omori et al. |
| 7,856,226 B2 | 12/2010 | Wong et al. |
| 7,865,182 B2 | 1/2011 | Macaluso |
| 7,868,778 B2 | 1/2011 | Kenwright |

| | | |
|---|---|---|
| 7,873,344 B2 | 1/2011 | Bowser et al. |
| 7,873,705 B2 | 1/2011 | Kalish |
| 7,877,090 B2 | 1/2011 | Maes |
| 7,881,199 B2 | 2/2011 | Krstulich |
| 7,882,029 B2 | 2/2011 | White |
| 7,886,047 B1 | 2/2011 | Potluri |
| 7,890,084 B1 | 2/2011 | Dudziak et al. |
| 7,890,111 B2 | 2/2011 | Bugenhagen |
| 7,903,553 B2 | 3/2011 | Liu |
| 7,911,975 B2 | 3/2011 | Droz et al. |
| 7,912,025 B2 | 3/2011 | Pattenden et al. |
| 7,912,056 B1 | 3/2011 | Brassem |
| 7,920,529 B1 | 4/2011 | Mahler et al. |
| 7,929,960 B2 | 4/2011 | Martin et al. |
| 7,937,069 B2 | 5/2011 | Rassam |
| 7,941,184 B2 | 5/2011 | Prendergast et al. |
| 7,945,240 B1 | 5/2011 | Klock et al. |
| 7,948,952 B2 | 5/2011 | Hurtta et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,957,020 B2 | 6/2011 | Mine et al. |
| 7,957,511 B2 * | 6/2011 | Drudis et al. ............ 379/201.01 |
| 7,962,622 B2 | 6/2011 | Friend et al. |
| 7,970,350 B2 | 6/2011 | Sheynman et al. |
| 7,970,426 B2 | 6/2011 | Poe et al. |
| 7,975,184 B2 | 7/2011 | Goff et al. |
| 7,984,130 B2 | 7/2011 | Bogineni et al. |
| 7,986,935 B1 | 7/2011 | D'Souza et al. |
| 8,005,459 B2 | 8/2011 | Balsillie |
| 8,010,080 B1 | 8/2011 | Thenthiruperai et al. |
| 8,010,081 B1 | 8/2011 | Roskowski |
| 8,015,133 B1 | 9/2011 | Wu et al. |
| 8,015,234 B2 | 9/2011 | Lum et al. |
| 8,019,687 B2 | 9/2011 | Wang et al. |
| 8,023,425 B2 | 9/2011 | Raleigh |
| 8,036,600 B2 | 10/2011 | Garrett et al. |
| 8,050,275 B1 | 11/2011 | Iyer |
| 8,064,896 B2 | 11/2011 | Bell et al. |
| 8,068,824 B2 | 11/2011 | Shan et al. |
| 8,094,551 B2 | 1/2012 | Huber et al. |
| 8,095,666 B2 | 1/2012 | Schmidt et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,108,520 B2 | 1/2012 | Ruutu et al. |
| 8,126,123 B2 | 2/2012 | Cai et al. |
| 8,135,388 B1 | 3/2012 | Gailloux et al. |
| 8,135,392 B2 | 3/2012 | Marcellino et al. |
| 8,144,591 B2 | 3/2012 | Ghai et al. |
| 8,155,620 B2 | 4/2012 | Wang et al. |
| 8,160,015 B2 | 4/2012 | Rashid et al. |
| 8,170,553 B2 | 5/2012 | Bennett |
| 8,184,530 B1 | 5/2012 | Swan et al. |
| 8,185,152 B1 | 5/2012 | Goldner |
| 8,185,158 B2 | 5/2012 | Tamura et al. |
| 8,190,675 B2 | 5/2012 | Tribbett |
| 8,194,549 B2 | 6/2012 | Huber et al. |
| 8,194,553 B2 | 6/2012 | Liang et al. |
| 8,195,093 B2 | 6/2012 | Garrett et al. |
| 8,200,775 B2 | 6/2012 | Moore |
| 8,204,190 B2 | 6/2012 | Bang et al. |
| 8,208,919 B2 | 6/2012 | Kotecha |
| 8,213,363 B2 | 7/2012 | Ying et al. |
| 8,214,536 B2 | 7/2012 | Zhao |
| 8,238,287 B1 | 8/2012 | Gopi et al. |
| 8,239,520 B2 | 8/2012 | Grah et al. |
| 8,244,241 B2 * | 8/2012 | Montemurro .................. 455/434 |
| 8,254,915 B2 | 8/2012 | Kozisek |
| 8,255,515 B1 | 8/2012 | Melman et al. |
| 8,255,689 B2 | 8/2012 | Kim et al. |
| 8,271,049 B2 | 9/2012 | Silver et al. |
| 8,291,238 B2 | 10/2012 | Ginter et al. |
| 8,315,594 B1 | 11/2012 | Mauser et al. |
| 8,335,161 B2 | 12/2012 | Foottit et al. |
| 8,350,700 B2 | 1/2013 | Fast et al. |
| 8,353,001 B2 | 1/2013 | Herrod |
| 2001/0053694 A1 | 12/2001 | Igarashi et al. |
| 2002/0022472 A1 | 2/2002 | Watler et al. |
| 2002/0120540 A1 | 8/2002 | Kende et al. |
| 2002/0131404 A1 | 9/2002 | Mehta et al. |
| 2002/0138601 A1 | 9/2002 | Piponius et al. |
| 2002/0176377 A1 | 11/2002 | Hamilton |
| 2002/0199001 A1 | 12/2002 | Wenocur et al. |
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0046396 A1 | 3/2003 | Richter et al. |
| 2003/0050070 A1 | 3/2003 | Mashinsky et al. |
| 2003/0050837 A1 | 3/2003 | Kim |
| 2003/0088671 A1 | 5/2003 | Klinker et al. |
| 2003/0133408 A1 | 7/2003 | Cheng et al. |
| 2003/0161265 A1 | 8/2003 | Cao et al. |
| 2003/0182420 A1 | 9/2003 | Jones et al. |
| 2003/0182435 A1 | 9/2003 | Redlich et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0236745 A1 | 12/2003 | Hartsell et al. |
| 2004/0019539 A1 | 1/2004 | Raman et al. |
| 2004/0021697 A1 | 2/2004 | Beaton et al. |
| 2004/0030705 A1 | 2/2004 | Bowman-Amuah et al. |
| 2004/0044623 A1 | 3/2004 | Wake et al. |
| 2004/0047358 A1 | 3/2004 | Chen et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0103193 A1 | 5/2004 | Pandya et al. |
| 2004/0107360 A1 | 6/2004 | Herrmann et al. |
| 2004/0127200 A1 | 7/2004 | Shaw et al. |
| 2004/0132427 A1 | 7/2004 | Lee et al. |
| 2004/0168052 A1 | 8/2004 | Clisham et al. |
| 2004/0198331 A1 | 10/2004 | Coward et al. |
| 2004/0236547 A1 | 11/2004 | Rappaport et al. |
| 2004/0249918 A1 | 12/2004 | Sunshine |
| 2005/0009499 A1 | 1/2005 | Koster |
| 2005/0021995 A1 | 1/2005 | Lal et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0060266 A1 | 3/2005 | DeMello et al. |
| 2005/0097516 A1 | 5/2005 | Donnelly et al. |
| 2005/0107091 A1 | 5/2005 | Vannithamby et al. |
| 2005/0128967 A1 | 6/2005 | Scobbie |
| 2005/0166043 A1 | 7/2005 | Zhang et al. |
| 2005/0183143 A1 | 8/2005 | Anderholm et al. |
| 2005/0198377 A1 | 9/2005 | Ferguson et al. |
| 2005/0216421 A1 | 9/2005 | Barry et al. |
| 2005/0228985 A1 | 10/2005 | Ylikoski et al. |
| 2005/0238046 A1 | 10/2005 | Hassan et al. |
| 2005/0246282 A1 | 11/2005 | Naslund et al. |
| 2005/0250508 A1 | 11/2005 | Guo et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0026679 A1 | 2/2006 | Zakas |
| 2006/0034256 A1 | 2/2006 | Addagatla et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0072646 A1 | 4/2006 | Feher et al. |
| 2006/0085543 A1 | 4/2006 | Hrastar et al. |
| 2006/0112016 A1 | 5/2006 | Ishibashi |
| 2006/0143098 A1 | 6/2006 | Lazaridis |
| 2006/0165060 A1 | 7/2006 | Dua |
| 2006/0178918 A1 | 8/2006 | Mikurak |
| 2006/0183462 A1 | 8/2006 | Kolehmainen et al. |
| 2006/0190314 A1 | 8/2006 | Hernandez |
| 2006/0199608 A1 | 9/2006 | Dunn et al. |
| 2006/0206904 A1 | 9/2006 | Watkins et al. |
| 2006/0218395 A1 | 9/2006 | Maes |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |

| | | | | | | |
|---|---|---|---|---|---|---|
| 2006/0258341 A1 | 11/2006 | Miller et al. | | 2008/0305793 A1 | 12/2008 | Gallagher et al. |
| 2006/0291477 A1 | 12/2006 | Croak et al. | | 2008/0311885 A1 | 12/2008 | Dawson et al. |
| 2007/0019670 A1 | 1/2007 | Falardeau | | 2008/0316923 A1 | 12/2008 | Fedders et al. |
| 2007/0022289 A1 | 1/2007 | Alt et al. | | 2008/0318547 A1 | 12/2008 | Ballou et al. |
| 2007/0036312 A1 | 2/2007 | Cai et al. | | 2008/0318550 A1 | 12/2008 | Deatley |
| 2007/0055694 A1 | 3/2007 | Ruge et al. | | 2008/0319879 A1 | 12/2008 | Carroll et al. |
| 2007/0061243 A1 | 3/2007 | Ramer et al. | | 2009/0005005 A1 | 1/2009 | Forstall et al. |
| 2007/0076616 A1 | 4/2007 | Ngo et al. | | 2009/0013157 A1 | 1/2009 | Beaule |
| 2007/0093243 A1 | 4/2007 | Kapadekar et al. | | 2009/0046723 A1 | 2/2009 | Rahman et al. |
| 2007/0100981 A1 | 5/2007 | Adamczyk et al. | | 2009/0054030 A1 | 2/2009 | Golds |
| 2007/0101426 A1 | 5/2007 | Lee et al. | | 2009/0067372 A1 | 3/2009 | Shah et al. |
| 2007/0104126 A1 | 5/2007 | Calhoun et al. | | 2009/0068984 A1 | 3/2009 | Burnett |
| 2007/0130315 A1 | 6/2007 | Friend et al. | | 2009/0077622 A1 | 3/2009 | Baum et al. |
| 2007/0140113 A1 | 6/2007 | Gemelos | | 2009/0079699 A1 | 3/2009 | Sun |
| 2007/0140275 A1 | 6/2007 | Bowman et al. | | 2009/0113514 A1 | 4/2009 | Hu |
| 2007/0198656 A1 | 8/2007 | Mazzaferri et al. | | 2009/0125619 A1 | 5/2009 | Antani |
| 2007/0220251 A1 | 9/2007 | Rosenberg et al. | | 2009/0180391 A1 | 7/2009 | Petersen et al. |
| 2007/0226225 A1 | 9/2007 | Yiu et al. | | 2009/0197585 A1 | 8/2009 | Aaron |
| 2007/0243862 A1 | 10/2007 | Coskun et al. | | 2009/0219170 A1 | 9/2009 | Clark et al. |
| 2007/0248100 A1 | 10/2007 | Zuberi et al. | | 2009/0248883 A1 | 10/2009 | Suryanarayana et al. |
| 2007/0254675 A1 | 11/2007 | Zorlu Ozer et al. | | 2009/0257379 A1 | 10/2009 | Robinson et al. |
| 2007/0255848 A1 | 11/2007 | Sewall et al. | | 2009/0271514 A1 | 10/2009 | Thomas et al. |
| 2007/0259673 A1 | 11/2007 | Willars et al. | | 2009/0286507 A1 | 11/2009 | O'Neil et al. |
| 2007/0263558 A1 | 11/2007 | Salomone | | 2009/0287921 A1 | 11/2009 | Zhu et al. |
| 2007/0274327 A1 | 11/2007 | Kaarela et al. | | 2009/0288140 A1 | 11/2009 | Huber et al. |
| 2007/0282896 A1 | 12/2007 | Wydroug et al. | | 2009/0307746 A1 | 12/2009 | Di et al. |
| 2007/0294395 A1 | 12/2007 | Strub et al. | | 2009/0315735 A1 | 12/2009 | Bhavani et al. |
| 2007/0298764 A1 | 12/2007 | Clayton | | 2010/0017506 A1 | 1/2010 | Fadell |
| 2008/0005285 A1 | 1/2008 | Robinson et al. | | 2010/0027469 A1 | 2/2010 | Gurajala et al. |
| 2008/0005561 A1 | 1/2008 | Brown et al. | | 2010/0041364 A1 | 2/2010 | Lott et al. |
| 2008/0010452 A1 | 1/2008 | Holtzman et al. | | 2010/0042675 A1 | 2/2010 | Fujii |
| 2008/0039102 A1 | 2/2008 | Sewall et al. | | 2010/0043068 A1 | 2/2010 | Varadhan et al. |
| 2008/0049630 A1 | 2/2008 | Kozisek et al. | | 2010/0071053 A1 | 3/2010 | Ansari et al. |
| 2008/0052387 A1 | 2/2008 | Heinz et al. | | 2010/0082431 A1 | 4/2010 | Ramer et al. |
| 2008/0059474 A1 | 3/2008 | Lim | | 2010/0103820 A1 | 4/2010 | Fuller et al. |
| 2008/0059743 A1 | 3/2008 | Bychkov et al. | | 2010/0144310 A1 | 6/2010 | Bedingfield, Sr. et al. |
| 2008/0060066 A1 | 3/2008 | Wynn et al. | | 2010/0153781 A1 | 6/2010 | Hanna |
| 2008/0062900 A1 | 3/2008 | Rao | | 2010/0188975 A1 | 7/2010 | Raleigh |
| 2008/0064367 A1 | 3/2008 | Nath et al. | | 2010/0188990 A1 | 7/2010 | Raleigh |
| 2008/0066149 A1 | 3/2008 | Lim | | 2010/0188992 A1 | 7/2010 | Raleigh |
| 2008/0066150 A1 | 3/2008 | Lim | | 2010/0188994 A1 | 7/2010 | Raleigh |
| 2008/0081606 A1 | 4/2008 | Cole | | 2010/0191576 A1 | 7/2010 | Raleigh |
| 2008/0082643 A1 | 4/2008 | Storrie et al. | | 2010/0191612 A1 | 7/2010 | Raleigh |
| 2008/0083013 A1 | 4/2008 | Soliman et al. | | 2010/0191846 A1 | 7/2010 | Raleigh |
| 2008/0085707 A1 | 4/2008 | Fadell | | 2010/0192170 A1 | 7/2010 | Raleigh |
| 2008/0095339 A1 | 4/2008 | Elliott et al. | | 2010/0192212 A1 | 7/2010 | Raleigh |
| 2008/0098062 A1 | 4/2008 | Balia | | 2010/0195503 A1 | 8/2010 | Raleigh |
| 2008/0109679 A1 | 5/2008 | Wright et al. | | 2010/0197268 A1 | 8/2010 | Raleigh et al. |
| 2008/0120688 A1 | 5/2008 | Qiu et al. | | 2010/0198698 A1 | 8/2010 | Raleigh et al. |
| 2008/0127304 A1 | 5/2008 | Ginter et al. | | 2010/0198939 A1 | 8/2010 | Raleigh et al. |
| 2008/0130534 A1 | 6/2008 | Tomioka | | 2010/0325420 A1 | 12/2010 | Kanekar |
| 2008/0130656 A1 | 6/2008 | Kim et al. | | 2011/0126141 A1 | 5/2011 | King et al. |
| 2008/0132201 A1 | 6/2008 | Karlberg | | | | |
| 2008/0132268 A1 | 6/2008 | Choi-Grogan et al. | | FOREIGN PATENT DOCUMENTS | | |
| 2008/0134330 A1 | 6/2008 | Kapoor et al. | | | | |
| 2008/0147454 A1 | 6/2008 | Walker et al. | | EP | 1772988 A1 | 4/2007 |
| 2008/0160958 A1 | 7/2008 | Abichandani et al. | | EP | 1978772 A1 | 10/2008 |
| 2008/0162637 A1 | 7/2008 | Adamczyk et al. | | WO | WO99/65185 | 12/1999 |
| 2008/0162704 A1 | 7/2008 | Poplett et al. | | WO | WO 99/65185 | 12/1999 |
| 2008/0164304 A1 | 7/2008 | Narasimhan et al. | | WO | WO 03/014891 | 2/2003 |
| 2008/0167027 A1 | 7/2008 | Gautier et al. | | WO | WO 03/058880 | 4/2003 |
| 2008/0167033 A1 | 7/2008 | Beckers | | WO | WO 2004/028070 | 4/2004 |
| 2008/0168523 A1 | 7/2008 | Ansari et al. | | WO | WO 2004/077797 | 9/2004 |
| 2008/0177998 A1 | 7/2008 | Apsangi et al. | | WO | WO 2004/095753 | 11/2004 |
| 2008/0183812 A1 | 7/2008 | Paul et al. | | WO | WO 2006/004467 | 1/2006 |
| 2008/0184127 A1 | 7/2008 | Rafey et al. | | WO | WO 2006/050758 | 5/2006 |
| 2008/0189760 A1 | 8/2008 | Rosenberg et al. | | WO | WO 2006/073837 | 7/2006 |
| 2008/0207167 A1 | 8/2008 | Bugenhagen | | WO | WO 2006/077481 | 7/2006 |
| 2008/0212470 A1 | 9/2008 | Castaneda et al. | | WO | WO 2006/130960 | 12/2006 |
| 2008/0219268 A1 | 9/2008 | Dennison | | WO | WO 2007/001833 | 1/2007 |
| 2008/0221951 A1 | 9/2008 | Stanforth | | WO | WO 2007/014630 | 2/2007 |
| 2008/0222692 A1 | 9/2008 | Andersson et al. | | WO | WO 2007/018363 | 2/2007 |
| 2008/0225748 A1 | 9/2008 | Khemani et al. | | WO | WO 2007/053848 | 5/2007 |
| 2008/0229385 A1 | 9/2008 | Feder et al. | | WO | WO 2007/069245 | 6/2007 |
| 2008/0229388 A1 | 9/2008 | Maes | | WO | WO 2007/107701 | 9/2007 |
| 2008/0256593 A1 | 10/2008 | Vinberg et al. | | WO | WO 2008/017837 | 2/2008 |
| 2008/0262798 A1 | 10/2008 | Kim et al. | | WO | WO 2008/051379 | 5/2008 |
| 2008/0268813 A1 | 10/2008 | Maes | | WO | WO 2008/066419 | 6/2008 |
| 2008/0298230 A1 | 12/2008 | Luft et al. | | WO | WO 2008/080139 | 7/2008 |

| | | |
|---|---|---|
| WO | WO 2008/080430 | 7/2008 |
| WO | WO 2008/099802 | 8/2008 |
| WO | 2010088413 | 8/2010 |

OTHER PUBLICATIONS

International Search Report and Written Opinion mailed Mar. 9, 2010 from International Serial No. PCT/US2010/022240 filed Jan. 27, 2010.
Hartmann et al., Agent-Based Banking Transactions & Information Retrieval—What about Performance Issues? 1999.
Van Eijk, et al., GigaMobile, Agent Technology for Designing Personalized Mobile Service Brokerage, Jul. 1, 2002.
Yu Li, Dedicated E-Reading Devices: The State of the Art and Challenges, Scroll, vol. 1, No. 1, 2008.
Dikaiakos et al., A Distributed Middleware Infrastructure for Personalized Services, Nov. 24, 2003.
Rao et al., Evolution of Mobile Location-Based Services, Communication of the ACM, Dec. 2003.
Chandrasekhar et al., Femtocell Networks: A Survey, Jun. 28, 2008.
Hossain et al., Gain-Based Selection of Ambient Media Services in Pervasive Environments, 2008.
Author Unknown, 3GPP TS 23.203, V8.4.0, $3^{rd}$ Generation Partnership Project; Technical Specification Group Services and System Aspects; Policy and Charging Control Architecture (Release 8), Dec. 2008.
Author Unknown, 3GPP TS 23.401, V8.4.0, $3^{rd}$ Generation Partnership Project; Technical Specification Group Services and System Aspects; General Packer Radio Service (GPRS) Enhancements for Evolved Universal Terrestrial Radio Access Network (E-UTRAN) Access (Release 8), Dec. 2008.
Stephan Steglich, I-Centric User Interaction, Nov. 21, 2003.
Han et al., Information Collection Services for Qos-Aware Mobile Applications, 2005.
Alonistioti et al., Intelligent Architectures Enabling Flexible Service Provision and Adaptability, 2002.
Rolf Oppliger, Internet Security: Firewalls and Bey, Communications of the ACM, May 1997, vol. 40. No. 5.
Knight et al., Layer 2 and 3 Virtual Private Networks: Taxonomy, Technology, and Standardization Efforts, IEEE Communications Magazine, Jun. 2004.
Koutsopoulou et al., Middleware Platform for the Support of Charging Reconfiguration Actions, 2005.
Nilsson et al., A Novel MAC Scheme for Solving the QoS Parameter Adjustment Problem in IEEE802.11e EDCA, Feb. 2006.
Author Unknown, Overview of GSM, GPRS, and UMTS, Chapter 2, Nov. 4, 2008.
Chaouchi et al., Policy Based Networking in the Integration Effort of 4G Networks and Services, 2004 IEEE.
Zhu et al., A Survey of Quality of Service in IEEE 802.11 Networks, IEEE Wireless Communications, Aug. 2004.
Kyriakakos et al., Ubiquitous Service Provision in Next Generation Mobile Networks, Proceedings of the 13th IST Mobile and Wireless Communications Summit, Lyon, France, Jun. 2004.
Farooq et al., An IEEE 802.16 WiMax Module for the NS-3 Simulator, Mar. 2-6, 2009.
Author Unknown, HP, IP Multimedia Services Charging, A White Paper from HP, Jan. 2006.
Author Unknown, Kindle™ User's Guide $3^{rd}$ Edition, Copyright 2004-2009.

* cited by examiner

DEVICE ASSISTED SERVICES INSTALL

CROSS REFERENCE TO OTHER APPLICATIONS

This application claims priority to U.S. Provisional Patent Application No. 61/206,354 entitled SERVICES POLICY COMMUNICATION SYSTEM AND METHOD filed Jan. 28, 2009, U.S. Provisional Patent Application No. 61/206,944 entitled SERVICES POLICY COMMUNICATION SYSTEM AND METHOD filed Feb. 4, 2009, U.S. Provisional Application No. 61/207,393 entitled SERVICES POLICY COMMUNICATION SYSTEM AND METHOD filed Feb. 10, 2009, U.S. Provisional Patent Application No. 61/207,739 entitled SERVICES POLICY COMMUNICATION SYSTEM AND METHOD filed on Feb. 13, 2009, and U.S. Provisional Patent Application No. 61/264,120 entitled DEVICE ASSISTED SERVICES INSTALL filed on Nov. 24, 2009, which are incorporated herein by reference for all purposes.

This application is a continuation in part of co-pending U.S. patent application Ser. No. 12/380,780, entitled AUTOMATED DEVICE PROVISIONING AND ACTIVATION, filed on Mar. 2, 2009, which is incorporated herein by reference for all purposes, and which claims priority to U.S. Provisional Patent Application No. 61/206,354 entitled SERVICES POLICY COMMUNICATION SYSTEM AND METHOD filed Jan. 28, 2009, U.S. Provisional Patent Application No. 61/206,944 entitled SERVICES POLICY COMMUNICATION SYSTEM AND METHOD filed Feb. 4, 2009, U.S. Provisional Application No. 61/207,393 entitled SERVICES POLICY COMMUNICATION SYSTEM AND METHOD filed Feb. 10, 2009, and U.S. Provisional Patent Application No. 61/207,739 entitled SERVICES POLICY COMMUNICATION SYSTEM AND METHOD filed on Feb. 13, 2009, which are incorporated herein by reference for all purposes.

BACKGROUND OF THE INVENTION

With the advent of mass market digital communications, applications and content distribution, many access networks such as wireless networks, cable networks and DSL (Digital Subscriber Line) networks are pressed for user capacity, with, for example, EVDO (Evolution-Data Optimized), HSPA (High Speed Packet Access), LTE (Long Term Evolution), WiMax (Worldwide Interoperability for Microwave Access), DOCSIS, DSL, and Wi-Fi (Wireless Fidelity) becoming user capacity constrained. In the wireless case, although network capacity will increase with new higher capacity wireless radio access technologies, such as MIMO (Multiple-Input Multiple-Output), and with more frequency spectrum and cell splitting being deployed in the future, these capacity gains are likely to be less than what is required to meet growing digital networking demand.

Similarly, although wire line access networks, such as cable and DSL, can have higher average capacity per user compared to wireless, wire line user service consumption habits are trending toward very high bandwidth applications and content that can quickly consume the available capacity and degrade overall network service experience. Because some components of service provider costs go up with increasing bandwidth, this trend will also negatively impact service provider profits.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Device assisted services (DAS) install techniques are provided in accordance with some embodiments. In some embodiments, DAS install techniques for providing service processors for mobile devices are provided. In some embodiments, DAS install techniques for downloading/installing new and/or updated service processors for mobile devices are provided. In some embodiments, DAS install techniques for providing verified service processors for mobile devices are provided. In some embodiments, DAS install techniques for providing secured service processors for mobile devices are provided. In some embodiments, DAS install techniques include providing a generic first version service processor for downloading and installing a second version service processor. These and other DAS install techniques are described herein with respect to various embodiments.

Figure 1:
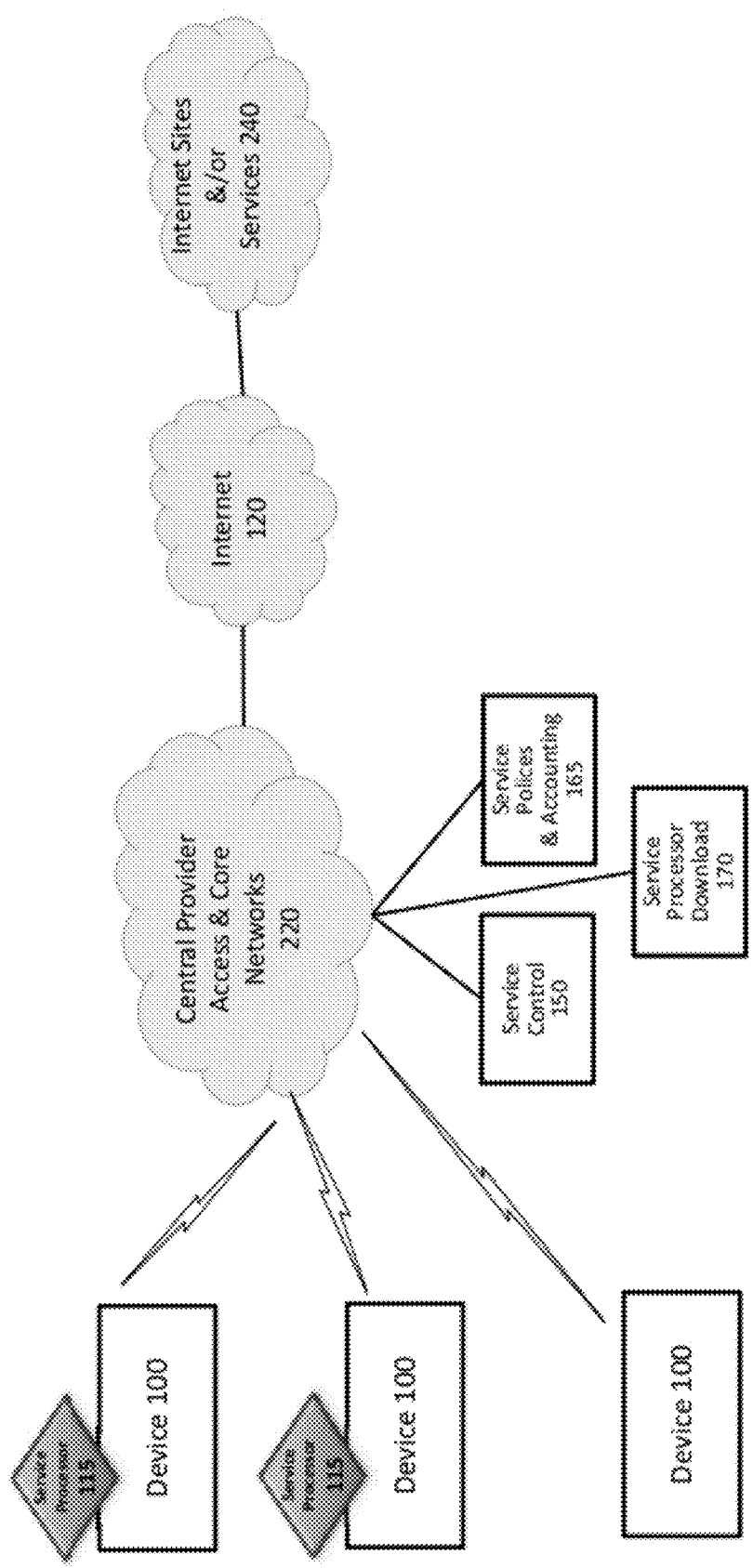
FIG. 1 illustrates a wireless network architecture for providing device assisted services (DAS) install techniques in accordance with some embodiments.

FIG. 1 illustrates a wireless network architecture for providing device assisted services (DAS) install techniques in accordance with some embodiments. As shown, FIG. 1 includes various wireless communications devices 100 (e.g., a mobile wireless device or an intermediate networking device) in wireless communication with central provider access and core networks 210. As shown, some of the devices 100 include service processors 115. For example, devices 100 can include various types of mobile phones, PDAs, computing devices, laptops, netbooks, tablets, cameras, music/media players, GPS devices, networked appliances, and any other networked device. In some embodiments, intermediate networking devices, as described herein, include a service processor or assist in the downloading of a service processor for one or more devices 100 to facilitate network access as described herein with respect to various embodiments. In some embodiments, a device 100 does not initially include a service processor (as shown in FIG. 1). In some embodiments, a service processor 115 is previously installed (e.g., during manufacture or distribution), or is downloaded and installed on a device 100 (as also shown in FIG. 1).

In some embodiments, the wireless communications device is a mobile communications device, and the service includes one or more Internet based services, and the mobile communications device includes one or more of the following: a mobile phone, a PDA, an eBook reader, a music device, an entertainment/gaming device, a computer, laptop, a netbook, a tablet, and a home networking system. In some embodiments, the wireless communications device includes a modem, and the processor is located in the modem. In some embodiments, an intermediate networking device includes any type of networking device capable of communicating with a device and a network, including a wireless network, example intermediate networking devices include a femto cell, or any network communication device that translates the wireless data received from the device to a network, such as an access network. In some embodiments, intermediate networking devices include 3G/4G WWAN to WLAN bridges/routers/gateways, femto cells, DOCSIS modems, DSL modems, remote access/backup routers, and other intermediate network devices.

In some embodiments, there are at least two versions of a service processor. For example, a first version service processor can be a generic version of a service processor version that can be pre-installed during manufacture or distribution and used for downloading a second version service processor. For example, the first version service processor can be a generic version that is not specific to a device group while the second version is specific to a device group. As another example, the first version service processor installed during time of manufacture or during device distribution may not contain all of the functions that are available for a permanent second version service processor that is installed when the device first connects to a network. As another example, service processors can be regularly updated to change the security parameters of the software, such as software signatures, encryption, obfuscation, secure query response sequence information, and/or other parameters, so that it becomes more difficult to hack or otherwise modify the software. As another example, the second version service processor can be uniquely associated with the device 100 (e.g., wireless communications device or an intermediate networking device) and the associated service plan and/or service provider. In some embodiments, a first version service processor is installed on a device 100 (e.g., service processor 115 installed on the device 100 can be a first version service processor that was previously installed during manufacture or distribution, or downloaded and installed during initial network access, as shown in FIG. 1). In some embodiments, a second version service processor is installed on a mobile device (e.g., service processor 115 can be a second version service processor that was previously installed during manufacture or distribution, or downloaded and installed during initial network access, as shown in FIG. 1).

In some embodiments, a new and/or updated version service processor 115 can be downloaded from, for example, a service processor download 170, as described herein. In some embodiments, the service processor download 170 provides a function or service that is located elsewhere in the network or partially located in elsewhere or integrated with/as part of other network elements (e.g., the service processor download 170 can be a function/service of service control 150 and/or service policies and accounting 165). In some embodiments, the devices 100 are in service control communication with service control 150 via central provider access and core networks 220 as shown in FIG. 1. Service policies and accounting functions 165 are also provided in communication with the central provider access and core networks 220 as shown in FIG. 1. In some embodiments, the service policies and accounting functions 165 provides a function or service that is located elsewhere in the network or partially located in elsewhere or integrated with/as part of other network elements (e.g., the service policies and accounting functions 165 can be a function/service of service control 150).

In some embodiments, the devices 100 network access is initially restricted to service control related access for service processor 115 verification and/or download(s)/update(s) (e.g., a first version service processor installed on the mobile device 100 can limit or direct network access to the service control 150, service processor download 170, and/or service policies and accounting function 165), as described herein with respect to various embodiments. In some embodiments, after this initial restricted access period is completed and/or if the service processor 115 of the mobile device 100 is verified for the device and is current/updated, the device 100 can communicate via the central provider access and core networks 220 to the Internet 120 for access to various Internet sites and/or services 240 as shown in FIG. 1 (e.g., Google sites/services, Yahoo sites/services, Blackberry services, Apple iTunes and AppStore, Amazon.com, FaceBook, and/or any other Internet based sites and/or services) based on, for example, the service plan associated with the device 100. In some embodiments, service usage information (e.g., based on network based CDRs or device generated CDRs, such as micro-CDRs generated by the service processor 115, and/or other service usage measures) are used for service control and/or service plan billing and reporting, as described herein with respect to various embodiments.

Those of ordinary skill in the art will appreciate that various other network architectures can be used for DAS install techniques, and FIG. 1 is illustrative of just another such example network architecture for which DAS install techniques described herein can be provided.

In some embodiments, FIG. 1 provides a wireless network architecture that also supports partitioned device groups, in which each device group can be provided independent and secure management. In some embodiments, partitioned device groups are provided. In some embodiments, each partitioned group of devices (e.g., mobile devices 100) can be uniquely managed with secure admin log-ins. In some embodiments, the partitioned device groups are securely managed using the service processor 115 installed on the devices 100 for that device group. In some embodiments, multi-device, multi-user accounting is provided. In some embodiments, capabilities are provided to support multi-party/multi-service reconciliation records to carriers and carrier partners. In some embodiments, service usage and profitability analytics are provided. For example, a partitioned beta test group of devices can be tested and optimized for various service usage policies and/or service plans, and then the optimized service usage policies and/or service plans can be published to an entire or larger device group. In some embodiments, a carrier can be provided a carrier branded device group, and/or a MVNO can be provided a MVNO branded device group.

In some embodiments, DAS install clients (e.g., bootstrappers for devices 100) are provided. In some embodiments, a first version service processor provides DAS install client function that facilitates a bootstrapping function for downloading and installing a second version service processor. In some embodiments, DAS install clients are provided for creating/downloading and installing a verifiable service processor for each device (e.g., a network capable device, such as a mobile wireless communications device or intermediate networking device). In some embodiments, a DAS install client downloads a uniquely secured service processer for device 100 (e.g., hashed/encrypted, such as based on device credentials, to prevent, for example, mass hacking or other security vulnerabilities, and/or a signed interface between the service processor and modem). In some embodiments, a non-advertised IP address allocated for each device group is rotated (e.g., to counter denial of service (DoS), distributed denial of service (DDS), and/or other types of attacks and/or vulnerabilities or exploits), and service processors are configured with multiple IP addresses for service control access (e.g., for secured network communication with service control 150 and/or service policies and accounting 165).

In some embodiments, DAS install techniques include one or more of the following operations. First, in some embodiments, whether a device is in a device group or list that includes an installed, up to date, and/or validated service processor is determined (e.g., verify that SIM, ESN, or other unique device identifier is registered, such as in a Home Location Register (HLR)/Network Information Repository (NIR) database or other authorized data store, as associated with service settings/policies for that device for service access and send its associated Charging Data Records (CDRs) to the service controller). Second, in some embodiments, if the device does not have an installed, up to date, and/or validated service processor, then the device is directed to, for example, an activation server to, for example, authenticate the device and/or verify a service processor for the device (e.g., ensure that a current and verified service processor version is installed and/or download a current and verified service processor version for the device).

For example, a DAS install client can be downloaded and installed (e.g., using various bootstrapping techniques, in which, for example, during the installation of the service processor software it is sometimes necessary to update the installer or package manager itself, by using, for example, a small executable file, such as a bootstrapper, that updates the installer and then initiates the new/updated/second version service processor installation after the update, and, in some cases, the bootstrapper can install other prerequisites for the service processor software during the bootstrapping process as well; and using network access to a download server, and/or from a website, including, for example, service processor download function 170) that allows for secure connection from the device (e.g., mobile device 100) to a secure download server (e.g., service processor download 170). In this example, support for a configuration of the device can be determined, such as through a device query or device download of client verification software can be used to verify the device hardware/software configuration). In this example, a user/device validation step can also be performed. For example, an authorization process for a user sign-up can be performed (e.g., based on a user name, MAC address, Turing machine text verification, and/or credit card verification or using other authorization/validation techniques), in which this can be performed automatically or the user/device can be required to enter certain credentials for authorization/validation.

In some embodiments, the authorization process also includes various security techniques for securely associating a user's identity with the device (e.g., using public key/TLS techniques, SSH techniques for TLS, and/or identity management techniques or other security techniques). For example, a check can also be performed to determine if the device was previously and/or is currently an activated device (e.g., the device is already associated with an active service plan). For example, whether the device belongs to a registered device group can also be determined during a DAS install, and if not, then the default settings for that type of device can be applied. In some embodiments, the service processor is encrypted, hashed, and/or obfuscated based on the previous determination (e.g., device group association, default device settings, and/or any other settings/criteria).

In some embodiments, if the device is not associated with a service plan (e.g., based on the device look-up using device based unique identifier(s)/credential(s) or using other techniques, as described herein), then the device can be redirected to a service portal for an activation offer for a service plan (e.g., using an activation server). In some embodiments, the portal utilizes header information to indicate that the device is a managed device (e.g., for a given service provider, MVNO, or other service partner) in the portal request to proxy to an appropriate proxy server for that service provider for the activation process.

In some embodiments, the device is in probation mode after the new service processor install (e.g., restricted a restricted IP address can be used for the service controller or other network element for service control instead of the secured service controller IP addresses reserved for validated and non-probation mode service processors, which, for example, can reduce the risks of various security risks, such as DoS, DDS, and/or other mass or other types of attacks against publicly or other more easily accessible service controller or download servers). In some embodiments, while in probation mode, the service processor executes more robust service monitoring techniques (e.g., more frequent and/or more robust service integrity checks and/or more frequent heartbeats, for example, to monitor actual device/user behavior with the associated expected behavior, as described herein with respect to various embodiments). In some embodiments, after a probation period ends, the device is provided access based on the associated service plan, which is managed, at least in part, by the service processor (e.g., service processor 115) in communication with, for example, a service controller (e.g., service control 150 and service policies and accounting 165) or other authorized network elements for service control.

In some embodiments, the various techniques and embodiments described herein can be readily applied to intermediate networking devices (e.g., an intermediate modem or networking device combination). In some embodiments, intermediate networking devices include, for example, WWAN/WLAN bridges, routers and gateways, cell phones with WWAN/WLAN or WWAN/Bluetooth, WWAN/LAN or WWAN/WPAN capabilities, femto cells, back up cards for wired access routers, and/or other intermediate networking devices. In some embodiments, an intermediate networking device (e.g., an intermediate modem or networking device combination) downloads and sends a service processor to one or more devices communicating via the intermediate networking device. In some embodiments, an appropriate and validated service processor is securely downloaded to the intermediate networking device, and the intermediate networking device performs the service processor functions for various wireless communication devices (e.g., mobile wireless communication devices) in communication with the intermediate networking device. In some embodiments, in which one or more wireless communication devices are in wireless communication via an intermediate networking device, some of the service processor functions are performed on the intermediate networking device (e.g., an appropriate and validated service processor is installed or securely downloaded and installed on the intermediate networking device), and some of the service processor functions are performed on the one or more wireless communication devices (e.g., an appropriate and validated service processor is installed or securely downloaded and installed on the mobile device) (e.g., stack controls can be performed on the mobile device and various other controls can be performed on the intermediate networking device). In some embodiments, the one or more wireless communication devices cannot access the network via the intermediate networking device (e.g., the devices are quarantined) unless the one or more wireless communication devices each have an installed and functioning verified service processor (e.g., using CDRs from intermediate networking device and/or network).

In some embodiments, a USB WLAN stick or other similar networking device is provided (e.g., including a modem) with DAS install client software that loads onto the device 100 and installs a service processor 115 on the device 100. In some embodiments, software on the device 100 instructs the user to insert a properly configured memory device (e.g., a secured USB memory stick, dongle, or other secured device that can provide a DAS install client software, a service processor image, and/or device credentials for network access). In some embodiments, the USB WLAN installed software assumes control over, for example, the network stack of the device (e.g., for managing network access) and sets various service policies based on whether the service is communicated via the USB WLAN stick or via the WiFi/other (e.g., including requiring no policies, such that access is open). In some embodiments, the DAS install client software on the USB WLAN stick provides a secure client that installs itself/certain software on the device that provides a DAS install client (e.g., bootstrapper) for the device, and the DAS install client downloads an appropriate service processor onto the device and/or the USB WLAN stick (e.g., the stack can also be located and managed on the USB WLAN stick).

In some embodiments, DAS install techniques include ensuring that a device's (e.g., the device modem's) credentials for the access network match the unique credentials for the service processor and the unique credentials for the device (e.g., MAC, SIM, MZ, and/or other unique credentials for the device). In some embodiments, DAS install techniques include ensuring that multiple IP addresses are not associated with the same service processor for a particular device. In some embodiments, DAS install techniques include determining that this is the same device/modem that a service processor was previously downloaded for and whether that prior service processor is still active on the network. If so, then, in some embodiments, the user is required to type in, for example, a password to continue, for example, a reimaging of the device (or prevent the new device install or to disable the previously activated other service processor).

In some embodiments, DAS install techniques include starting with a device that does not include a service processor (e.g., a device, with, for example, a SIM or EVDO ESSN, but with no service processor, attempts to connect to the network, an appropriate service processor for the device is determined, and then a uniquely associated service processor is downloaded and installed on the device, for example, using a bootstrapper, as similarly described herein). In some embodiments, unique device credentials (e.g., MAC, SIM, MZ, and/or other unique credentials for the device) are used to create a secure connection with, for example, the service controller (e.g., service control 150) or a secure download server (e.g., service processor download 170), to download a (e.g., new or replacement) service processor to be securely installed on the device. Accordingly, as similarly described herein, DAS install techniques can be applied to at least one or more of the following situations: a new service processor install; and/or a replacement service processor install (e.g., the originally/previously installed service processor was wiped/reimaged, hardware failure, or otherwise corrupted or deleted, and, thus, a replacement service processor is needed). In some embodiments, when a device connects to the network without, for example, a service processor, then a look up is performed (e.g., in a data store, such as a database) to determine whether the device is a member of a device group or a new device, and an appropriate service processor (e.g., version and settings) is provided for installation on the device. In some embodiments, when the device attempts an initial access to the network, at that time an updated version of a service processor for that device can be provided based on, for example, device type, device group, master agent, user interface (UI), settings, marketing pages, and/or other features and/or settings, which, for example, can allow for a new, changed, or evolving service plan/program by the time the device logs onto the network to provide, for example, for a dynamic and scalable solution.

In some embodiments, as similarly discussed above, two versions of the service processor are provided (e.g., a first version/image and a second version/image of the service processor software). In some embodiments, a first version service processor is a general purpose version used, for example, primarily for connecting to the network and loading a second version service processor software that, for example, can be one or more of the following: an updated version, a version tailored to a more specific purpose (e.g., based on a device type, device group, service type, service provider or service provider partner, or any other purpose/criteria), a version that includes additional features/functionality, an encrypted service processor version, a version that includes special service plan settings or capabilities associated with a device group, a version that includes specific branding or features/functionality for a given service provider or service provider partner associated with a device group, a version that includes special marketing materials to motivate the user to try or buy services or transactions associated with a device group, and various other versions as will now be apparent to one of ordinary skill in the art in view of the various embodiments described herein.

In some embodiments, depending on whether the user has pre-signed up for a service plan, for example, a different version of the service processor software and/or settings is/are downloaded to the device during this initial service processor download process, including, for example, one or more of the following: a different set of options for service plan choices, marketing materials, ambient service settings and service options, service plan settings, and possibly various other features and/or settings.

In some embodiments, the first version of the service processor is installed during manufacturing or in the distribution channel prior to sale of the device. In some embodiments, the first version of the service processor is installed after the time of sale of the device using various DAS install techniques as described herein with respect to various embodiments.

In some embodiments, the first version of the service processor is not uniquely encrypted so that a general purpose version of the first service processor image can be distributed to multiple devices (e.g., downloadable via the Internet, such as through a website, or a software update not installed by an operable service processor or a software image that is loaded onto the device before the device credentials or device group associations are available or known). In some embodiments, a non-encrypted generic version of the service processor is used for broad distribution to many devices in which the device credentials are not known at the time of service processor software distribution (e.g., the generic version of the service processor can log onto the network to access a software update function in the service controller or service control 150, service processor downloader or service process download 170, and/or similar authorized network function, then the service controller can obtain the device credentials and/or user information and provide an updated version of the service processor using the various techniques or similar techniques to those described herein). In some embodiments, the second/updated version of the service processor is uniquely encrypted (e.g., based at least in part on the device credentials or device group associations).

In some embodiments, a first version of the service processor need not be uninstalled and replaced by a new install of a second version of the service processor, as, in some embodiments, the second version of the service processor includes updates to the first version of the service processor, settings changes to the first version of the service processor, and/or encryption or obfuscation of the first version of the service processor to provide a second version of the service processor that is uniquely associated with the device, the device user, the device group, and/or the service plan associated with the device. In some embodiments, the second/updated version of the service processor includes one or more restricted IP addresses providing for access to the secured service control/service controller IP addresses reserved for validated and non-probation mode service processors, which, for example, can reduce the risks of various security risks for the secured service control/service controller(s), such as DoS, DDS, and/or other mass or security attacks against publicly or other more easily accessible service control/service controller(s) and/or service processor download servers.

In some embodiments, the second version of the service processor is uniquely associated with some aspect(s) of the device credentials and/or user information with a temporary user account (e.g., also sometimes referred to herein as a dummy user account) or user account. In some embodiments, the second version of the service processor and/or the settings in the service processor are chosen based on a look up of some aspect of the device credentials and/or the user information to determine which device group version of the service processor and/or settings should be loaded. In some embodiments, when there is no appropriate device group association or the user preference takes priority over device group association, the first version of the service processor software is used to log onto the network (e.g., including potentially the service controller) to select a service offer, or device group association that then determines the second version and/or settings of the service processor software that will be loaded onto the device.

In some embodiments, the first version of the service processor is installed on aftermarket devices, and after installation this more general purpose version of the service processor provides for access to the service control/service controller (or similar network function). In some embodiments, the service control/service controller determines what type of device and/or what operating system (OS) software and/or what modem and modem software is on the device, and then loads an appropriate version of the service processor for that device or facilitates an updating of the first version of the service processor to provide a second version of the service processor for that device.

In some embodiments, the service processor is distributed on a peripheral device suitable for use with more than one type of device and/or more than one type of OS. Accordingly, in some embodiments, more than one version of the service processor can be shipped with the device for installation on the device once the device type and/or OS type is/are known, with each version of the software either being a first version of the service processor software as discussed above, or a second version or final version of the service processor software as similarly discussed above with respect to various embodiments.

In some embodiments, the first version/second version service processor software techniques, for example, allow for installations of a new OS version that is not compatible in some way with the present version of the service processor. For example, the installation of such a new and incompatible OS version can render the currently installed service processor version incapable of connecting to the network and updating the service processor. In such an example, a first version service processor software image that is compatible with the new OS can be used to access the network (e.g., connect to the service control/service controller or some other network element) to download and install a new, possibly uniquely encrypted and compatible second service processor image, as similarly discussed above with respect to various embodiments.

In some embodiments, the first version/second version service processor software techniques, for example, can handle situations in which a device has an inadvertently wiped or damaged service processor image such that the device is no longer capable of logging onto the network with its secure credentials and/or uniquely encrypted service processor software image. In such an example, the first version software processor can then be used as similarly described above with respect to various embodiments to download and install a new/replacement second version service processor on the device.

In some embodiments, there are multiple types of device log-in to the service control/service controller depending on whether a first or second version service processor is being used. For example, if a second version service processor is being used, which, in some embodiments, includes unique secure credentials, a uniquely encrypted or secure heartbeat channel, and/or a uniquely encrypted service processor software image, then the capabilities of the device and/or service processor to access the network and/or service controller elements can be as similarly described herein with respect to various embodiments. However, if the device is using a first version service processor, which, for example, does not have unique secure credentials, a uniquely encrypted heartbeat control channel, and/or a uniquely encrypted software image, then the heartbeat control channel traffic can be handled in a differential manner as compared to the traffic handling implemented for a second version service processor image. For example, the service controller heartbeat processing elements can detect that the service processor is a first version service processor and can then route the heartbeat traffic through a different set of security processes that do not rely on all the security aspects present in a second version service processor. As another example, the first version service processor can be a widely distributed software image that does not have unique encryption on the heartbeat channel and can be handled differentially, such as handled with a different server designed to handle insecure traffic and designed to not be disposed or easily exposed to mass or other security attacks (e.g., DoS, DDS attacks, and other types of security related and/or mass/large scale attacks against a network element, such as a download server or web/application server).

In some embodiments, a device supports two or more operating systems (e.g., different versions of operating systems and/or different operating systems) and for each operating system includes a compatible service processor. For example, when a dual boot configured device boots in a first operating system version, then a first service processor that is compatible with that first operating system version is selected for network access, and when the dual boot configured device boots in a second operating system version, then the second service processor that is compatible with that second operating system version is selected for network access.

In some embodiments, initial network access for a device is directed to a service controller (e.g., service control 150), service processor downloader (e.g., service processor download 170), and/or similar network element for managing service control. In some embodiments, initial network access is restricted to this initial network access to the service controller, service processor downloader, and/or similar network element for managing service control. In some embodiments, such initial network access is restricted until the device has been verified for network access, as similarly discussed herein with respect to various embodiments. In some embodiments, such initial network access is restricted until the device has been verified for network access and an appropriate service processor has been verified on the device and/or downloaded and installed on the device, as similarly discussed herein with respect to various embodiments. In some embodiments, such initial network access is restricted using various techniques, such as using a first version of a service processor on the device that restricts such initial network access. In some embodiments, such initial network access is restricted to and maintained in probation mode, as similarly described herein (e.g., a restricted IP address can be used for the service controller or other network element for service control instead of the secured service controller IP addresses reserved for validated and non-probation mode service processors, which, for example, can reduce the risks of various security risks, such as DoS, DDS, and/or other mass attacks against publicly or other more easily accessible service controller or download servers). For example, such initial network access can include access to a common activation server, which the device can access for determination of a supported configuration for a new or second service processor image download. As another example, such initial network access can direct the device to an initial web page including access to a service plan offer and purchase options (e.g., providing for a device credential look up for device group, provide choices of programs to user, or other service plan offer and purchase options). As another example, the initial web page can include access to a service plan offer and purchase options and a service processor verification and download/update function.

In some embodiments, a network based charging data record (CDR) feed, as described herein with respect to various embodiments, is provided for monitoring service usage by managed devices. In some embodiments, the CDR feed includes device generated CDRs or micro-CDRs generated by the service processor (e.g., service processor 115 can generate CDRs for monitored service usage on the device, which can, for at least some CDRs, include unique transaction codes for uniquely identifying the monitored service usage based on service or other categorizations/criteria) on the device (e.g., a mobile device or an intermediate networking device for that mobile device). In some embodiments, the CDR feed is a real-time (e.g., near real-time) network based CDR feed provided for determining whether any devices have been compromised (e.g., a hack of a first version or second version service processor providing for unrestricted service usage for such devices, and/or any other mass or security attack or vulnerability or exploit). For example, such a CDR feed can be used to determine abnormal or unusual traffic patterns and/or service level usage activities, which, for example, can be used to identify and/or protect against a DoS/DDS attack or other types of security attacks.

In some embodiments, based on various device and/or network based monitoring techniques, as described herein with respect to various embodiments, a determination is made that the service processor (e.g., service processor 115) is not functioning properly (e.g., may have been damaged and/or compromised/tampered with and, for example, allowing network access beyond the device's associated service plan and/or not properly monitoring/billing for such service usage) and that a new/replacement service processor should be downloaded. In some embodiments, a new/replacement service processor can be downloaded and installed in such situations, using the various techniques described herein with respect to various embodiments. In some embodiments, based on various criteria (e.g., service usage monitoring, billing, and/or any other criteria) or based on proactive and/or periodic administrative/security measures, a new/replacement service processor can be downloaded and installed, using the various techniques described herein with respect to various embodiments.

In some embodiments, based on, for example, service plan changes (e.g., user changes to their service plan), service provider changes (e.g., service provider changes to their services/service policies or the associated service plan), device changes (e.g., operating system version or other software platform changes or various hardware changes), a new service processor can be downloaded and installed or the installed service processor can be updated, using the various techniques described herein with respect to various embodiments.

Figure 2:
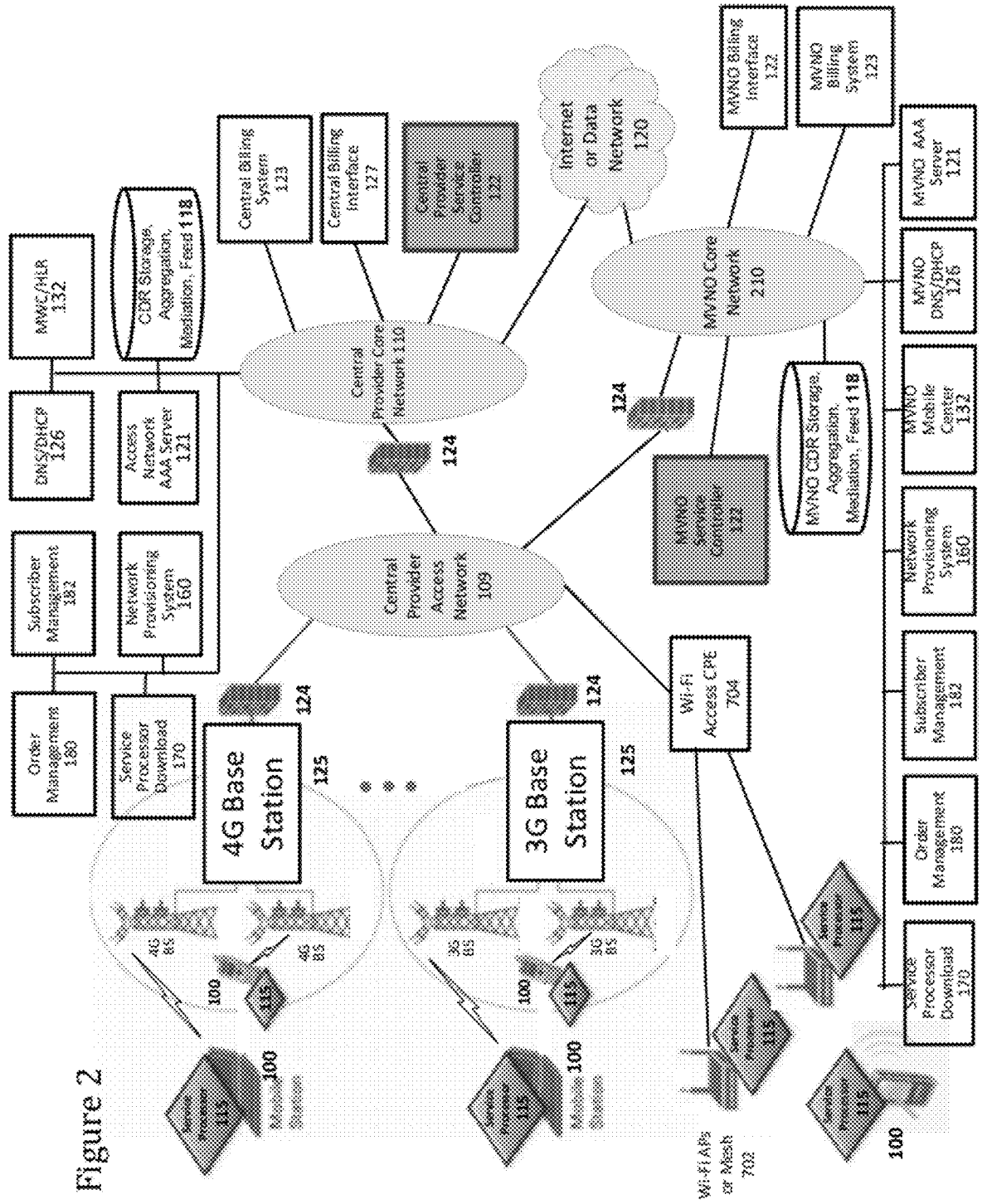
FIG. 2 illustrates another wireless network architecture for providing DAS install techniques in accordance with some embodiments.

FIG. 2 illustrates another wireless network architecture for providing DAS install techniques in accordance with some embodiments. As shown, FIG. 2 includes a 4G/3G/2G wireless network operated by, for example, a central provider. As shown, various wireless mobile devices 100 are in communication with base stations 125 for wireless network communication with the wireless network, and other devices 100 are in communication with Wi-Fi Access Points (APs) or Mesh 702 for wireless communication to Wi-Fi Access CPE 704 in communication with central provider access network 109. In some embodiments, each of the mobile devices 100 includes a service processor 115 (as shown), which, for example, can be initially installed, downloaded, and/or updated service processors (e.g., first/second version service processor images) using service processor download function 170 as described herein, and each service processor 115 connects through a secure control plane link to a service controller 122. In some embodiments, the service processor download function 170 is located elsewhere in the network or partially located in elsewhere or integrated with/as part of other network elements as will be apparent to one of ordinary skill in the art in view of the various embodiments disclosed herein.

In some embodiments, service usage information includes network based service usage information (e.g., charging data records (CDRs)), which is obtained from one or more network elements. In some embodiments, service usage information includes micro-CDRs provided by the service processor (e.g., service processor 115) installed on the device (e.g., mobile device 100). In some embodiments, micro-CDRs are used for CDR mediation or reconciliation that provides for service usage accounting on any device activity that is desired, as described herein with respect to various embodiments. In some embodiments, each device activity that is desired to be associated with a billing event is assigned a micro-CDR transaction code, and the service processor 115 is programmed to account for that activity associated with that transaction code. In some embodiments, the service processor 115 periodically reports (e.g., during each heartbeat or based on any other periodic, push, and/or pull communication technique(s)) micro-CDR usage measures to, for example, the service controller 122 or some other network element. In some embodiments, the service controller 122 reformats the heartbeat micro-CDR usage information into a valid CDR format (e.g., a CDR format that is used and can be processed by an SGSN or GGSN) and then transmits it to an authorized network element for CDR mediation (e.g., CDR storage, aggregation, mediation, feed 118, billing system 123, and/or billing interface 127 or another authorized network element/function). In some embodiments, CDR mediation is used to account for the micro-CDR service usage information by depositing it into an appropriate service usage account and deducting it from the user device bulk service usage account. For example, this technique provides for a flexible service usage billing solution that uses pre-existing solutions for CDR mediation and billing. For example, the billing system (e.g., billing system 123 and/or billing interface 127) processes the mediated CDR feed from CDR storage, aggregation, mediation, feed 118, applies the appropriate account billing codes to the aggregated micro-CDR information that was generated by the device, and then generates billing events in a manner that does not require changes to billing systems and/or billing infrastructure (e.g., using new transaction codes to label the new device assisted billing capabilities).

As shown in FIG. 2, a CDR storage, aggregation, mediation, feed 118 is provided. In some embodiments, the CDR storage, aggregation, mediation, feed 118 receives, stores, aggregates and mediates micro-CDRs received from mobile devices 100. In some embodiments, the CDR storage, aggregation, mediation, feed 118 also provides a settlement platform using the mediated micro-CDRs, as described herein with respect to various embodiments. In some embodiments, another network element provides the settlement platform using aggregated and/or mediated micro-CDRs (e.g., central billing interface 127 and/or another network element). In some embodiments, various techniques for partitioning of device groups are used for partitioning the mobile devices 100 (e.g., allocating a subset of mobile devices 100 for a distributor, an OEM, a MVNO, and/or another partner). As also shown in FIG. 2, a MVNO core network 210 also includes a MVNO CDR storage, aggregation, mediation, feed 118, a MVNO billing interface 122, and a MVNO billing system 123. In some embodiments, the MVNO CDR storage, aggregation, mediation, feed 118 receives, stores, aggregates and mediates micro-CDRs received from mobile devices 100 (e.g., MVNO group partitioned devices).

Those of ordinary skill in the art will appreciate that various other network architectures can be used for providing DAS install techniques, and FIG. 2 is illustrative of just one such example network architecture for which DAS install techniques described herein can be provided.

In some embodiments, CDR storage, aggregation, mediation, feed 118 (e.g., service usage 118, including a billing aggregation data store and rules engine) is a functional descriptor for, in some embodiments, a device/network level service usage information collection, aggregation, mediation, and reporting function located in one or more of the networking equipment apparatus/systems attached to one or more of the sub-networks shown in FIG. 2 (e.g., central provider access network 109 and/or central provider core network 110), which is in communication with the service controller 122, and a central billing interface 127. As shown, service usage 118 provides a function in communication with the central provider core network 110. In some embodiments, the CDR storage, aggregation, mediation, feed 118 function is located elsewhere in the network or partially located in elsewhere or integrated with/as part of other network elements. In some embodiments, CDR storage, aggregation, mediation, feed 118 functionality is located or partially located in the AAA server 121 and/or the mobile wireless center/Home Location Register (HLR) 132 (as shown, in communication with a DNS/DHCP server 126). In some embodiments, service usage 118 functionality is located or partially located in the base station, base station controller and/or base station aggregator, collectively referred to as base station 125 in FIG. 2. In some embodiments, CDR storage, aggregation, mediation, feed 118 functionality is located or partially located in a networking component in the central provider access network 109, a networking component in the core network 110, the central billing system 123, the central billing interface 127, and/or in another network component or function. This discussion on the possible locations for the network based and device based service usage information collection, aggregation, mediation, and reporting function (e.g., CDR storage, aggregation, mediation, feed 118) can be easily generalized as described herein and as shown in the other figures described herein as would be apparent to one of ordinary skill in the art. Also as shown in FIG. 2, the service controller 122 is in communication with the central billing interface 127 (also sometimes referred to as the external billing management interface or billing communication interface), which is in communication with the central billing system 123. As shown, an order management 180 and a subscriber management 182 are also in communication with the central provider core network 110 for facilitating order and subscriber management of services for the devices 100 in accordance with some embodiments, and a network provisioning system 160 is also provided in communication with the central provider core network 110 for facilitating network provisioning functions.

In some embodiments, the CDR storage, aggregation, mediation, feed 118 (and/or other network elements or combinations of network elements) provides a device/network level service usage information collection, aggregation, mediation, and reporting function. In some embodiments, the CDR storage, aggregation, mediation, feed 118 (and/or other network elements or combinations of network elements) collects device generated usage information for one or more devices on the wireless network (e.g., devices 100); and provides the device generated usage information in a syntax and a communication protocol that can be used by the wireless network to augment or replace network generated usage information for the one or more devices on the wireless network. In some embodiments, the syntax is a charging data record (CDR), and the communication protocol is selected from one or more of the following: 3GPP, 3GPP2, or other communication protocols. In some embodiments, as described herein, the CDR storage, aggregation, mediation, feed 118 collects/receives micro-CDRs for one or more devices on the wireless network (e.g., devices 100). In some embodiments, the CDR storage, aggregation, mediation, feed 118 (and/or other network elements or combinations of network elements) includes a service usage data store (e.g., a billing aggregator) and a rules engine for aggregating the collected device generated usage information. In some embodiments, the network device is a CDR feed aggregator, and the CDR storage, aggregation, mediation, feed 118 (and/or other network elements or combinations of network elements) also aggregates CDRs and/or micro-CDRs for the one or more devices on the wireless network; applies a set of rules to the aggregated CDRs and/or micro-CDRs using a rules engine (e.g., bill by account, transactional billing, revenue sharing model, and/or any other billing or other rules for service usage information collection, aggregation, mediation, and reporting), and communicates a new set of CDRs for the one or more devices on the wireless network to a billing interface or a billing system (e.g., providing a CDR with a billing offset by account/service).

In some embodiments, the CDR storage, aggregation, mediation, feed 118 (and/or other network elements or combinations of network elements) communicates a new set of CDRs (e.g., aggregated and mediated CDRs and/or micro-CDRs that are then translated into standard CDRs) for the one or more devices on the wireless network to a billing interface (e.g., central billing interface 127) or a billing system (e.g., central billing system 123). In some embodiments, the CDR storage, aggregation, mediation, feed 118 (and/or other network elements or combinations of network elements) communicates with a service controller (e.g., service controller 122) to collect the device generated usage information (e.g., micro-CDRs) for the one or more devices on the wireless network. In some embodiments, the CDR storage, aggregation, mediation, feed 118 (and/or other network elements or combinations of network elements) communicates with a service controller, in which the service controller is in communication with a billing interface or a billing system. In some embodiments, the CDR storage, aggregation, mediation, feed 118 (and/or other network elements or combinations of network elements) communicates the device generated usage information to a billing interface or a billing system. In some embodiments, the CDR storage, aggregation, mediation, feed 118 (and/or other network elements or combinations of network elements) communicates with a transport gateway (not shown) and/or a Radio Access Network (RAN) gateway (not shown) to collect the network generated usage information for the one or more devices on the wireless network. In some embodiments, the service controller 122 communicates the device generated service usage information (e.g., micro-CDRs) to the CDR storage, aggregation, mediation, feed 118 (and/or other network elements or combinations of network elements).

In some embodiments, the CDR storage, aggregation, mediation, feed 118 (and/or other network elements or combinations of network elements) performs rules for performing a bill by account aggregation and mediation function. In some embodiments, the CDR storage, aggregation, mediation, feed 118 (and/or other network elements or combinations of network elements) performs rules for performing a service billing function, as described herein, and/or for performing a service/transactional revenue sharing function, as described herein. In some embodiments, the service controller 122 in communication with the CDR storage, aggregation, mediation, feed 118 (and/or other network elements or combinations of network elements) performs a rules engine for aggregating and mediating the device generated usage information (e.g., micro-CDRs). In some embodiments, a rules engine device in communication with the CDR storage, aggregation, mediation, feed 118 (and/or other network elements or combinations of network elements) performs a rules engine for aggregating and mediating the device generated usage information.

In some embodiments, the rules engine is included in (e.g., integrated with/part of) the CDR storage, aggregation, mediation, feed 118. In some embodiments, the rules engine and associated functions, as discussed herein, is a separate function/device. In some embodiments, the service controller 122 performs some or all of these rules engine based functions, as discussed herein, and communicates with the central billing interface 127. In some embodiments, the service controller 122 performs some or all of these rules engine based functions, as discussed herein, and communicates with the central billing system 123.

In some embodiments, duplicate CDRs are sent from the network equipment to the billing system 123 that is used for generating service billing. In some embodiments, duplicate CDRs are filtered to send only those CDRs/records for devices controlled by the service controller and/or service processor (e.g., managed devices). For example, this approach can provide for the same level of reporting, lower level of reporting, and/or higher level of reporting as compared to the reporting required by the central billing system 123.

In some embodiments, the service controller 122 sends the device generated CDRs to the rules engine (e.g., service usage 118), and the rules engine applies one or more rules, such as those described herein and/or any other billing/service usage related rules as would be apparent to one of ordinary skill in the art. In some embodiments, the service controller 122 generates CDRs similar to other network elements, and the rules (e.g., bill-by-account) are performed in the central billing interface 127. For example, for the service controller 122 to generate CDRs similar to other network elements, in some embodiments, the service controller 122 is provisioned on the wireless network and behaves substantially similar to other CDR generators on the network) as would be apparent to one of ordinary skill in the art.

In some embodiments, the service controller 122 is provisioned as a new type of networking function that is recognized as a valid and secure source for CDRs by the other necessary elements in the network (e.g., CDR storage, aggregation, mediation, feed 118). In some embodiments, where the network necessary apparatus will only recognize CDRs from certain types of networking equipment (e.g. a RAN gateway or transport gateway), then the service controller 122 can provide authentication credentials to the other networking equipment that indicate it is one of the approved types of equipment. In some embodiments, the link between the service controller 122 and the necessary CDR aggregation and mediation equipment is secured, authenticated, encrypted, and/or signed.

In some embodiments, the CDR storage, aggregation, mediation, feed 118 discards the network based service usage information (e.g., network based CDRs) received from one or more network elements. In these embodiments, the service controller 122 can provide the device based service usage information (e.g., device based CDRs or micro-CDRs) to the CDR storage, aggregation, mediation, feed 118 (e.g., the CDR storage, aggregation, mediation, feed 118 can just provide a store, aggregate, and communication function(s)), and the device based service usage information is provided to the central billing interface 127 or the central billing system 123.

In some embodiments, the device based CDRs (e.g., micro-CDRs) and/or new CDRs generated based on execution of a rules engine as described herein are provided only for devices that are managed and/or based on device group, service plan, or any other criteria, categorization, and/or grouping, such as based on ambient service or ambient service provider or transactional service or transactional service provider.

In some embodiments, based on, for example, service plan changes (e.g., user changes to their service plan), service provider changes (e.g., service provider changes to their services/service policies or the associated service plan), micro-CDR transaction code changes, and/or any other related changes, a new service processor can be downloaded and installed or the installed service processor can be updated to allow, for example, the tracking of one or more service usage activities by the device using micro-CDRs (e.g., for new or previously unmonitored/untracked service usage activities, using, for example, new or updated micro-CDR transaction codes (uniquely) associated with such service usage activities), using the various techniques described herein with respect to various embodiments.

Figure 3:
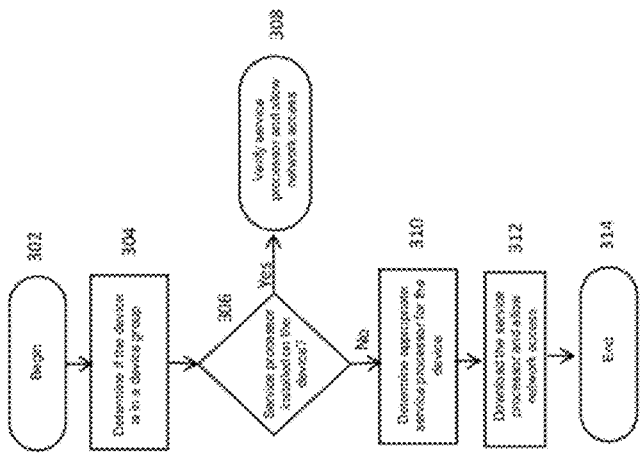
FIG. 3 illustrates a flow diagram for DAS install techniques in accordance with some embodiments.

FIG. 3 illustrates a flow diagram for DAS install techniques in accordance with some embodiments. At 302, the process begins. At 304, whether a device (e.g., mobile device 100) is in a device group is determined. At 306, whether the device includes a service processor is determined. If so, at 308, then the installed service processor is verified (e.g., up to date and/or validated for that device, device group, and/or associated service plan) and network access is allowed (e.g., managed/monitored by the installed and verified service processor according to the associated service plan for the device). Otherwise (e.g., the device does not have an installed service processor), at 310, then an appropriate service processor for the device is determined (e.g., based on the device type, device group, and/or version, such as hardware/software platform of the device, an associated service plan, service provider, and/or any other criteria or settings). At 312, the service processor is downloaded and installed (e.g., using a bootstrap process or other techniques, as described herein with respect to various embodiments) and network access is allowed (e.g., managed/monitored by the installed service processor according to the associated service plan for the device).

In some embodiments, the device is also directed to, for example, an activation server to, for example, authenticate the device and/or verify a service processor for the device (e.g., ensure that a current and verified service processor version is installed and/or download a current and verified service processor version for the device) prior to allowing such network access. For example, a DAS install client can be downloaded (e.g., using bootstrapping or other/similar techniques, from a download server and/or from a website) that allows for secure connection from the device (e.g., mobile device 100) to a secure download server (e.g., service processor download 170) (e.g., support for a configuration of the device is determined, such as through a device query or device download of client verification software can be used to verify the device hardware/software configuration). In this example, a user/device validation step can also be performed. For example, an authorization process for a user sign-up can be performed (e.g., based on a user name, MAC address, Turing machine text verification, credit card verification, and/or other authorization/validation techniques), in which this can be performed automatically or the user/device can be required to enter certain credentials for authorization/validation. In some embodiments, the authorization process also includes various techniques for associating a user's identity with the device (e.g., using public key/TLS techniques, SSH techniques for TLS, and/or identity management techniques). In this example, a check can also be performed to determine if the device was previously and/or is currently an activated device (e.g., the device is already associated with a service plan). For example, whether the device belongs to a registered device group can be determined, and if not, then the default settings for that type of device can be applied. In some embodiments, the service processor is encrypted, hashed, and/or obfuscated based on the previous determination (e.g., device group association and/or default device settings). In some embodiments, if the device is not associated with a service plan (e.g., based on the device look-up using device based unique identifier(s)/credential(s), as described herein), then the device can be redirected to a service portal for an activation offer for a service plan (e.g., using an activation server). In some embodiments, the portal utilizes header information to indicate that the device is a managed device (e.g., for a given service provider, MVNO, or other service partner) in the portal request to proxy to an appropriate proxy server for that service provider for the activation process. At 314, the process is completed.

Figure 4:
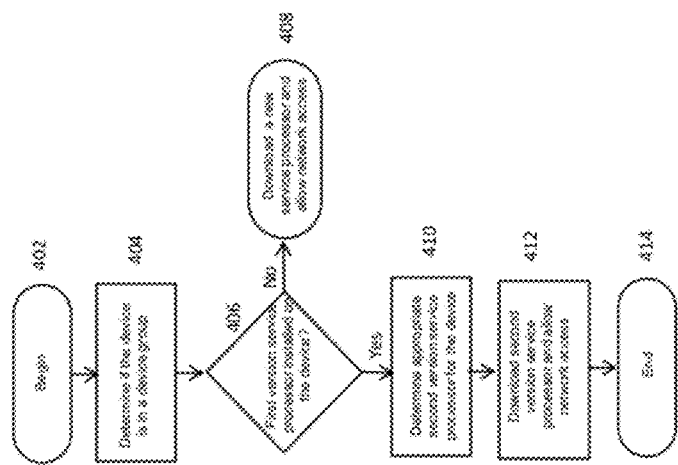
FIG. 4 illustrates another flow diagram for DAS install techniques in accordance with some embodiments.

FIG. 4 illustrates another flow diagram for DAS install techniques in accordance with some embodiments. At 402, the process begins. At 404, whether a device (e.g., mobile device 100) is in a device group is determined (e.g., or other list that indicates that this device includes an installed, up to date, and/or validated service processor, and, for example, to also verify that the SIM, ESN, or other unique device identifier is registered, such as in an HLR/NIR database, as associated with service settings/policies for that device for service access). At 406, whether the device includes a first version service processor is determined. If not (e.g., the device does not have an installed first version service processor), at 408, then a new service processor is downloaded (e.g., as similarly discussed above with respect to FIG. 3) and network access is allowed (e.g., managed/monitored by the installed new service processor according to the associated service plan for the device). Otherwise (e.g., the device includes an installed first version service processor), then at 410, an appropriate second version service processor for the device is determined (e.g., based on the device type and version, such as hardware/software platform, device group, an associated service plan, service provider, and/or any other criteria or settings). At 412, the second version service processor (e.g., secured for the device, using various techniques, as described herein) is downloaded and installed (e.g., using bootstrapping or other/similar techniques, as described herein), or in some embodiments, the first version of the service processor is updated to provide a second version service processor uniquely associated with the device, and network access is allowed (e.g., managed/monitored by the installed second version service processor according to the associated service plan for the device). At 414, the process is completed.

Figure 5:
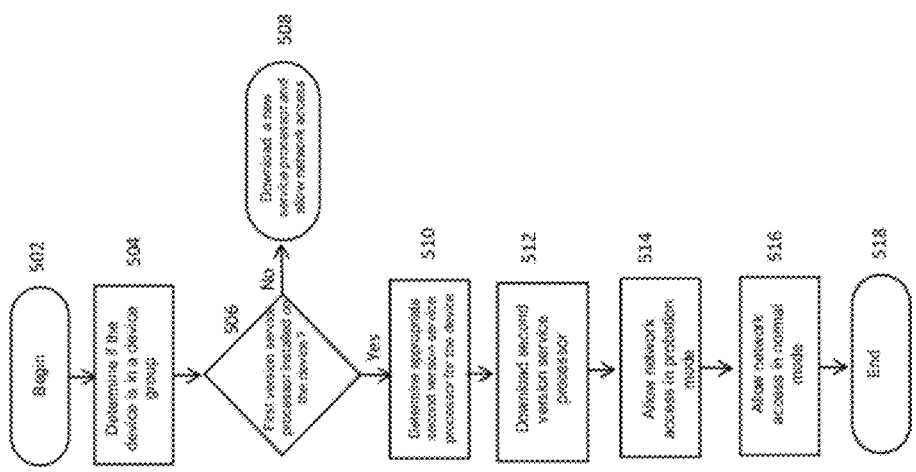
FIG. 5 illustrates another flow diagram for DAS install techniques in accordance with some embodiments.

FIG. 5 illustrates another flow diagram for DAS install techniques in accordance with some embodiments. At 502, the process begins. At 504, whether a device (e.g., mobile device 100) is in a device group is determined (e.g., as similarly described above with respect to FIG. 3). At 506, whether the device includes a first version service processor is determined. If not (e.g., the device does not have an installed first version service processor), at 508, then a new service processor is downloaded (e.g., as similarly discussed above with respect to FIG. 3) and network access is allowed (e.g., managed/monitored by the installed new service processor according to the associated service plan for the device). Otherwise (e.g., the device includes an installed first version service processor), at 410, then an appropriate second version service processor for the device is determined (e.g., based on the device type and version, such as hardware/software platform, device group, an associated service plan, service provider, and/or any other criteria or settings). At 512, the second version service processor (e.g., secured using various techniques, as described herein) is downloaded and installed (e.g., using a bootstrap process or other/similar techniques, as described herein). At 514, network access is allowed in probation mode, as described herein with respect to various embodiments. For example, the device can be managed in probation mode after the new/second version service processor install (e.g., service control communication can be limited to a particular set of probation mode IP addresses that can be used for the service controller or other network element for service control instead of the secured service controller IP addresses reserved for validated and non-probation mode service processors, which, for example, can reduce the risks of various security risks, such as DoS, DDS, or other mass or other security attacks against publicly or other more easily accessible service controller or download servers). In some embodiments, while in probation mode, the service processor executes more robust service monitoring techniques (e.g., more frequent and/or more robust service integrity checks and/or more frequent heartbeats, for example, to monitor actual device/user behavior with the associated expected behavior). At 516, after the probation period is completed (e.g., based on time, monitored activities, and/or any other criteria), network access is allowed in normal mode (e.g., the device is no longer operating in the probation mode, as described herein). For example, after a probation period is completed (e.g., based on time, monitored activities, and/or any other criteria), the device is provided access based on the associated service plan, which is managed, at least in part, by the service processor in communication with, for example, a service controller or other network element for service control. At 518, the process is completed.

In some embodiments, the device OS requires a pre-registered and signed version of the service processor software in order for the OS to allow the service processor to be installed or updated. In such embodiments, a sequence of pre-registered, pre-signed service processor software versions that have differing security parameters (e.g. encryption, signature, obfuscation, differences in code sequences, information for query—response sequences, and/or other security parameters) are provided. In some embodiments, the pre-registered service processors are used to regularly update the service processor software for a portion of devices connected to the network, or for all devices connected to the network. In some embodiments, a specific version of the service processor is assigned to a given device, and other versions with other security parameters will not be allowed to obtain service from the network. For example, more than one version of the software can be registered and distributed at any one time so that a hacker cannot create code that works for all devices. A sequence of service processor versions can be held in reserve and deployed when a successful software hack version is detected in the field for one or more previous service processor versions, and the new versions that have been held in reserve can be used to update devices in the field. As the reserved versions have not yet been distributed prior to the detection of a successful hack, it is not possible for a hacker to have a hacked version of the new software, and by refreshing new versions on a frequent basis it can become impossible for a hacker to successfully hack the new versions before additional new versions are deployed. Such embodiments can buy time by keeping successful software hacks out of the devices in the field until the successful software hack can be analyzed and a systematic security solution implemented to prevent the hack from remaining effective.

In some embodiments not all of the service processor software is modified into pre-registered modified security configuration versions that are regularly refreshed, but instead a portion of the service processor software that includes unique security information (e.g., security keys, signatures and/or responses to secure queries, and/or other security information, and/or the capability to analyze the integrity of the other service processor software). In this manner, when a device is suspected of being hacked the new service processor software portion with different security configuration can be updated and used to ascertain the integrity of the existing service processor configuration, which makes the update process shorter and lower bandwidth.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor of a network device configured to:
   determine whether a communications device in communication with the system over a wireless network includes a first version service processor for assisting control of a use by the communications device of a service on the wireless network, wherein the first version service processor includes a service profile that includes at least one service policy setting, and wherein the service profile provides for access to the service; and
   when the communications device includes the first version service processor,
      determine a device group associated with the communications device, and
      download a second version service processor to the communications device based on the device group; and
memory of the network device coupled to the processor and configured to provide the processor with instructions.

2. The system recited in claim 1, wherein the first version service processor is uniquely associated with the communications device.

3. The system recited in claim 1, wherein the communications device is activated prior to a point of sale of the communications device, and the service profile is associated with the communications device during activation.

4. The system recited in claim 1, wherein the service profile is associated with the communications device during a manufacture of the communications device, during a distribution of the communications device, or at a point of sale of the communications device.

5. The system recited in claim 1, wherein the service profile is associated with an ambient service plan that provides a low cost or free trial service plan that is bundled or provided as an option for purchase at a point of sale of the communications device.

6. The system recited in claim 1, wherein the communications device includes a plurality of service processors for supporting a plurality of operating systems or a plurality of service plans.

7. The system recited in claim 1, wherein the communications device is a mobile communications device or an intermediate networking device, and the service includes one or more Internet based services.

8. The system recited in claim 1, wherein the communications device is a mobile communications device, and the service includes one or more Internet based services, and wherein the mobile communications device includes one or more of the following: a mobile phone, a personal digital assistant (PDA), an eBook reader, a music device, an entertainment device, a gaming device, a computer, a laptop, a netbook, a tablet, and a home networking system.

9. The system recited in claim 1, wherein the communications device includes a modem, and at least one of the first version service processor and the second version service processor is located in the modem.

10. The system recited in claim 1, wherein the at least one service policy setting includes one or more of the following: an access control setting, a traffic control setting, a billing system setting, a user notification with acknowledgement setting, a user notification with synchronized service usage information setting, a user privacy setting, a user preference setting, an authentication setting, an admission control setting, an application access setting, a content access setting, a transaction setting, a network communication setting, and a device management communication setting.

11. The system recited in claim 1, wherein the processor is further configured to verify an implementation of the service profile based on one or more of the following: device generated service usage information and network generated service usage information.

12. The system recited in claim 1, wherein the processor of the network device is further configured to:
when the communications device does not include the first version service processor, download the first version service processor or the second version service processor to the communications device.

13. The system recited in claim 1, wherein the processor of the network device is further configured to:
when the communications device does not include the first version service processor, download the first version service processor or the second version service processor to the communications device using a bootstrapper.

14. The system recited in claim 1, wherein the processor of the network device is further configured to:
when the communications device includes the first version service processor, update the first version service processor.

15. The system recited in claim 1, wherein the processor of the network device is further configured to:
when the communications device includes the first version service processor, download a replacement service processor to the communications device.

16. The system recited in claim 1, wherein the processor of the network device is further configured to:
allow the communications device access to the service in a probation mode that allows for access to the service with increased service monitoring or limited service capabilities that are limited based on one or more of the following: a period of time, a network address, a service type, a content type, an application type, a bandwidth, and a data usage.

17. The system recited in claim 1,
wherein the second version service processor is uniquely associated with the communications device.

18. The system recited in claim 1, wherein the processor of the network device is further configured to:
when the communications device includes the first version service processor, download an updated service processor to the communications device.

19. The system recited in claim 1,
wherein the second version service processor is uniquely associated with the communications device based on one or more device credentials of the communications device.

20. The system recited in claim 1,
wherein the second version service processor is uniquely associated with the communications device based on one or more device credentials of the communications device and based on user information associated with a temporary user account.

21. The system recited in claim 1, wherein the processor of the network device is further configured to:
when the communications device includes the first version service processor, download a service processor update to the communications device, wherein the service processor update includes one or more updates to the first version service processor.

22. The system recited in claim 1, wherein the processor of the network device is further configured to:
when the communications device includes the first version service processor, download a service processor update to the communications device, wherein the service processor update includes one or more settings changes to the first version service processor.

23. The system recited in claim 1, wherein the second version service processor is uniquely associated with the communications device, a communications device user, a device group, or a service plan.

24. The system recited in claim 1,
wherein the second version service processor is uniquely associated with the communications device, and wherein the second version service processor includes one or more restricted Internet protocol (IP) addresses providing for access to a service controller reserved for verified and non-probation mode service processors.

25. The system recited in claim 1, wherein the first version service processor allows for limited access to the wireless network for purposes of service control and for permitting selection of a service plan, and wherein the
second version service processor is based on a service plan selection for the communications device.

26. The system recited in claim 1,
wherein the second version service processor facilitates a dual boot configuration that provides support for at least two operating systems executed on the communications device.

27. The system recited in claim 1, wherein the service profile includes an option to purchase a service plan for the communications device, wherein the service plan includes additional service capabilities, and
wherein the second version service processor is associated with the service plan.

28. The system recited in claim 1, wherein the processor of the network device is configured to download the second version service processor to the communications device based on one or more of the following: a service plan selection, an indication of tampering with the service processor, an update availability, and a periodic service processor verification request.

29. A method performed by a network system, comprising:
determining whether a communications device in communication with the network system over a wireless network includes a first version service processor for assisting control of a use by the communications device of a service on the wireless network, wherein the first version service processor includes a service profile that includes at least one service policy setting, and wherein the service profile provides for access to the service; and when the communications device includes the first version service processor, determining a device group associated with the communications device, and downloading a second version service processor to the communications device based on the device group.

30. A computer program product, the computer program product being embodied in a non-transitory computer readable storage medium and comprising computer instructions for causing a network system to perform the steps of:

determining whether a communications device in communication with the network system over a wireless network includes a first version service processor for assisting control of a use by the communications device of a service on the wireless network, wherein the first version service processor includes a service profile that includes at least one service policy setting, and wherein the service profile provides for access to the service; and when the communications device includes the first version service processor, determining a device group associated with the communications device, and downloading a second version service processor to the communications device based on the device group.

* * * * *